United States Patent
Ryu et al.

(10) Patent No.: US 12,255,310 B2
(45) Date of Patent: Mar. 18, 2025

(54) APPARATUS FOR PRODUCING PRECURSOR HAVING CONCENTRATION GRADIENT AND MATERIAL INJECTION SCHEDULING METHOD THEREFOR

(71) Applicants: POSCO, Pohang-si (KR); RESEARCH INSTITUTE OF INDUSTRIAL SCIENCE & TECHNOLOGY, Pohang-si (KR)

(72) Inventors: Hwang Yol Ryu, Pohang-si (KR); Ki Sung You, Pohang-si (KR)

(73) Assignees: POSCO HOLDINGS INC., Pohang-si (KR); RESEARCH INSTITUTE OF INDUSTRIAL SCIENCE & TECHNOLOGY, Pohang-si (KR)

( * ) Notice: Subject to any disclaimer, the term of this patent is extended or adjusted under 35 U.S.C. 154(b) by 262 days.

(21) Appl. No.: 16/957,458

(22) PCT Filed: Dec. 12, 2018

(86) PCT No.: PCT/KR2018/015779
§ 371 (c)(1),
(2) Date: Jun. 24, 2020

(87) PCT Pub. No.: WO2019/132331
PCT Pub. Date: Jul. 4, 2019

(65) Prior Publication Data
US 2020/0373556 A1    Nov. 26, 2020

(30) Foreign Application Priority Data

Dec. 26, 2017   (KR) .................. 10-2017-0180061

(51) Int. Cl.
*H01M 4/134*   (2010.01)
*H01M 4/1395*  (2010.01)
(Continued)

(52) U.S. Cl.
CPC ......... *H01M 4/134* (2013.01); *H01M 4/1395* (2013.01); *H01M 10/0404* (2013.01); *H01M 10/054* (2013.01); *H01M 10/058* (2013.01)

(58) Field of Classification Search
None
See application file for complete search history.

(56) References Cited

U.S. PATENT DOCUMENTS

2013/0202966 A1\*   8/2013   Yu .................... H01M 4/505
                                                    429/223
2013/0214200 A1     8/2013   Yang et al.
(Continued)

FOREIGN PATENT DOCUMENTS

CN    104347866 A  *  2/2015
CN    104812477 A     7/2015
(Continued)

OTHER PUBLICATIONS

Espacenet machine translation of KR 2017/0072549 A (original cited on IDS of Aug. 10, 2021). (Year: 2017).*
(Continued)

*Primary Examiner* — Jonathan G Leong
*Assistant Examiner* — Katharine A Caughron
(74) *Attorney, Agent, or Firm* — Morgan, Lewis & Bockius LLP

(57) ABSTRACT

The present invention relates to a material injection scheduling method for producing a precursor having a concentration gradient using an apparatus for producing a precursor having a concentration gradient mixing materials of a first feed tank and a second feed tank with each other in advance in a mixer and injecting the mixed material into a reactor.

8 Claims, 14 Drawing Sheets

(51) Int. Cl.
  *H01M 10/04* (2006.01)
  *H01M 10/054* (2010.01)
  *H01M 10/058* (2010.01)

(56) References Cited

U.S. PATENT DOCUMENTS

| | | | |
|---|---|---|---|
| 2013/0234674 | A1 | 9/2013 | Nazri |
| 2015/0053890 | A1* | 2/2015 | Sun .................. H01M 4/02 |
| | | | 252/182.1 |
| 2015/0270549 | A1 | 9/2015 | Noh et al. |
| 2015/0311521 | A1 | 10/2015 | Ryu et al. |
| 2016/0118662 | A1 | 4/2016 | Schroedle et al. |
| 2016/0126548 | A1 | 5/2016 | Schroedle et al. |
| 2017/0179485 | A1 | 6/2017 | Vogler et al. |
| 2017/0288262 | A1 | 10/2017 | Choi et al. |

FOREIGN PATENT DOCUMENTS

| | | |
|---|---|---|
| CN | 204429248 U | 7/2015 |
| CN | 107346824 A | 11/2017 |
| GB | 2410741 A | 8/2005 |
| JP | 2002-352855 A | 12/2002 |
| JP | 2014-505334 A | 2/2014 |
| JP | 2016-522147 A | 7/2016 |
| KR | 10-2009-0082288 A | 7/2009 |
| KR | 10-2013-0111413 A | 10/2013 |
| KR | 10-2014-0142171 A | 12/2014 |
| KR | 10-2015-0141450 A | 12/2015 |
| KR | 10-2016-077388 A | 7/2016 |
| KR | 10-2016-0081452 A | 7/2016 |
| KR | 10-1702572 B1 | 2/2017 |
| KR | 10-2017-0072549 A | 6/2017 |
| KR | 10-2018-0074250 A | 7/2018 |
| KR | 10-2019-0072111 A | 6/2019 |
| KR | 10-2019-0078240 A | 7/2019 |
| WO | 2013/025505 A3 | 5/2013 |

OTHER PUBLICATIONS

Espacenet machine translation of CN-107346824-A (Year: 2017).*
S, Ferguson, et al., "In-situ monitoring and characterization of plug flow crystallizers," Chemical Engineering Science, Oxford, GB, vol. 77, 2012, p. 105-111, XP028500295.
Extended European Search Report dated Jan. 29, 2021 issued in European Patent Application No. 18894714.7.
Japanese Office Action dated Aug. 3, 2021 issued in Japanese Patent Application No. 2020-535244.
International Search Report dated Mar. 21, 2019, issued in International Patent Application No. PCT/KR2018/015779.
Chinese Office Action dated Oct. 28, 2021, issued in corresponding Chinese Patent Application No. 201880088511.X.

* cited by examiner

APPARATUS FOR PRODUCING PRECURSOR HAVING CONCENTRATION GRADIENT AND MATERIAL INJECTION SCHEDULING METHOD THEREFOR

CROSS-REFERENCE TO RELATED APPLICATION(S)

This application is the U.S. National Phase under 35 U.S.C. § 371 of International Patent Application No. PCT/KR2018/015779, filed on Dec. 12, 2018, which in turn claims priority to and the benefit of Korean Patent Application No. 10-2017-0180061 filed in the Korean Intellectual Property Office on Dec. 26, 2017, the entire contents of which are incorporated herein by reference.

The present invention relates to an apparatus for producing a precursor having a concentration gradient and a material injection scheduling method therefor, and more particularly, to an apparatus for producing a precursor having a concentration gradient in which two materials are mixed with each other in advance using a mixer and injected into a reactor, and a material injection scheduling method therefor.

TECHNICAL FIELD

Background Art

A rechargeable lithium secondary battery has a significantly higher energy density than a conventional battery, but has a disadvantage in that a thermal property is poor due to an unstable crystal structure of a cathode active material at a high temperature. Therefore, as a method for solving such a disadvantage, a method for producing a precursor whose metal composition has a concentration gradient has been studied.

The precursor having the concentration gradient, as shown in FIG. 1, refers to a precursor in which a core portion is formed of a material having the same composition ratio, and a shell portion is formed so that a composition ratio gradually changes radially.

In order to produce such a precursor having the concentration gradient, conventionally, as shown in FIG. 2, metal solutions having different composition ratios are injected from a Q1 feed tank to a Q2 feed tank, the metal solutions are continuously injected from the Q1 feed tank to the Q2 feed tank at a fixed constant flow rate during a reaction time, and the entire metal solutions mixed within a given reaction time are injected from the Q2 feed tank to a reactor, such that the concentration gradient is adjusted. That is, it has been used the method of producing the precursor having the concentration gradient by separately preparing metal solutions having different composition ratios for the respective feed tanks, injecting the metal solution of the other feed tank into one of the feed tanks, mixing the metal solution of the other feed tank with the metal solution of one feed tank, and then feeding the mixed metal solutions to the reactor. However, such a conventional manner has a limitation in increasing productivity of a manufacturing facility because the Q1 feed tank, the Q2 feed tank and the reactor need to be configured in one set.

DISCLOSURE

Technical Problem

The present invention has been made in an effort to provide an apparatus for producing a precursor having a concentration gradient having advantages of significantly improving productivity.

Further, the present invention has been made in an effort to provide a material injection scheduling method having advantages of producing a precursor having a uniform concentration gradient.

Technical Solution

An exemplary embodiment of the present invention provides a material injection scheduling method for producing a precursor having a concentration gradient used for creating a material injection schedule in an apparatus for producing a precursor having a concentration gradient mixing materials of a first feed tank and a second feed tank with each other in advance in a mixer and injecting the mixed material into a reactor, the method including: (a) a step of calculating a feed flow rate of the mixer; (b) a step of calculating a feed flow rate of the material of the first feed tank during a total process time in a pattern in which it gradually decreases for each feeding step; (c) a step of calculating an optimum amount making a difference in the feed flow rate of the material of the first feed tank constant; (d) a step of correcting the feed flow rate of the material of the first feed tank by redistributing the optimum amount to each feeding step in a reverse order; and (e) a step of calculating a feed flow rate of the material of the second feed tank by subtracting the feed flow rate of the material of the first feed tank corrected in the step (d) from the feed flow rate of the mixer.

The material injection scheduling method may further include, between the step (a) and the step (b), (f) a step of calculating a time taken for feeding the entire material of the first feed tank in consideration of an amount of the material of the first feed tank injected into the mixer in advance.

The material injection scheduling method may further include, between the step (b) and the step (c), (e) a step of determining whether or not the difference in the feed flow rate of the material of the first feed tank is the same between feeding steps other than between a first feeding step and a second feeding step and between a last feeding step and a feeding step just before the last feeding step.

If it is determined in the step (e) that the difference in the feed flow rate of the material of the first feed tank is not the same between feeding steps other than between the first feeding step and the second feeding step and between the last feeding step and the feeding step just before the last feeding step, the step (b) may be performed again.

The material injection scheduling method may further include, between the step (e) and the step (c), (f) a step of summing the feed flow rates of the material of the first feed tank in all feeding steps; and (g) a step of determining whether or not a sum of the feed flow rates of the material of the first feed tank is greater than a total amount of the material to be injected from the first feed tank into the mixer.

If the sum of the feed flow rates of the material of the first feed tank is not greater than the total amount of the material to be injected from the first feed tank into the mixer in the step (g), the step (c) is not performed and the pattern calculated in the step (b) may be determined to be an injection schedule of the material of the first feed tank, and if the sum of the feed flow rates of the material of the first feed tank is greater than the total amount of the material to be injected from the first feed tank into the mixer in the step (g), the step (c) may be performed.

The material injection scheduling method may further include, between the step (d) and the step (e), (h) a step of determining whether or not a difference between the sum of the feed flow rates of the material of the first feed tank and the total amount of the material to be injected from the first feed tank into the mixer is a predetermined value or less.

If the difference between the sum of the feed flow rates of the material of the first feed tank and the total amount of the material to be injected from the first feed tank into the mixer is not the predetermined value or less in the step (h), the step (c) and the step (d) may be performed again.

The material of the first feed tank may be a mixed solution of nickel and cobalt, and the material of the second feed tank may be a mixed solution of nickel, cobalt, and manganese.

Another exemplary embodiment of the present invention provides an apparatus for producing a precursor having a concentration gradient including: a first feed tank storing a first material; a second feed tank storing a second material; a plurality of mixers mixing the first material and the second material each fed from the first feed tank and the second feed tank with each other; and a plurality of reactors co-precipitating the mixed material fed from the plurality of mixers, wherein the plurality of mixers correspond to the plurality of reactors in a one-to-one manner.

A predetermined amount of the first material may be injected into the plurality of mixers in advance, the first material may be a mixed solution of nickel and cobalt, the second material may be a mixed solution of nickel, cobalt, and manganese, and a co-precipitation reaction may occur in the reactor.

Advantageous Effects

When an apparatus for producing a precursor having a concentration gradient and a material injection scheduling method according to an exemplary embodiment of the present invention is used, a precursor having a uniform concentration gradient may be produced even though a reaction time is changed, such that the quality of the precursor may be improved, and preliminary verification for the concentration gradient may be performed, such that a variation in precursor quality may be minimized.

MODE FOR INVENTION

Figure 1:
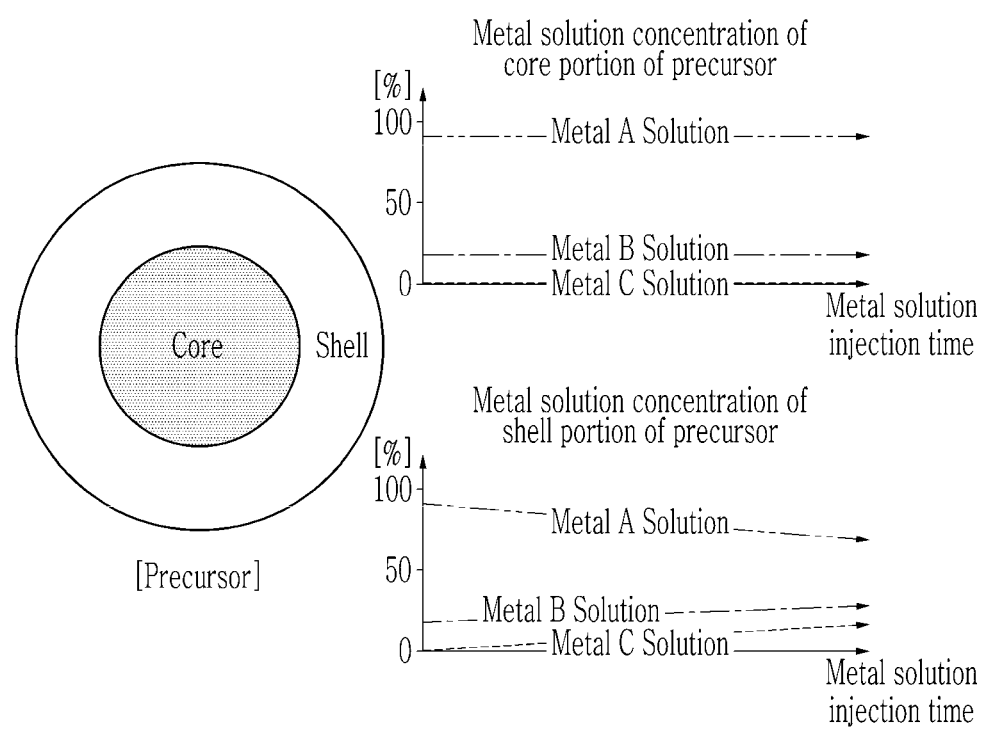
FIG. 1 is a conceptual diagram of a precursor having a concentration gradient.
Figure 2:
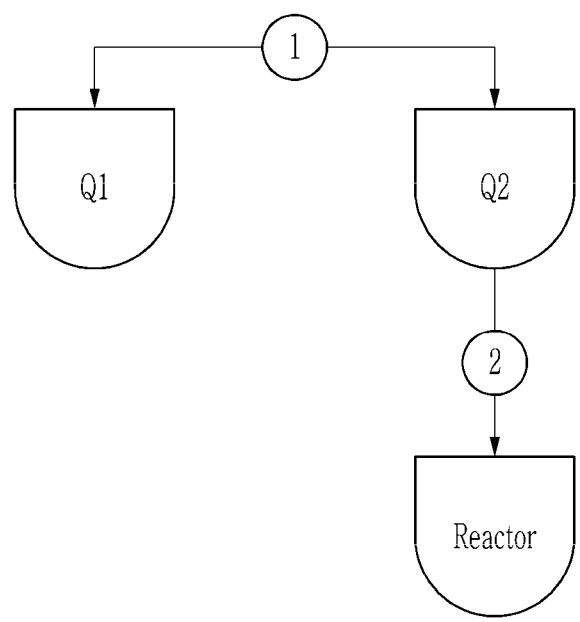
FIG. 2 is a view schematically illustrating an apparatus for producing a precursor having a concentration gradient according to the prior art.

Hereinafter, embodiments of the present invention will be described on detail with reference to the accompanying drawing so that those skilled in the art may easily practice the present invention. The present invention may be implemented in various different forms and is not limited to exemplary embodiments provided herein.

Portion unrelated to the description will be omitted to obviously describe the present disclosure, and same or similar portions will be denoted by same or similar reference numerals throughout the specification.

Figure 3:
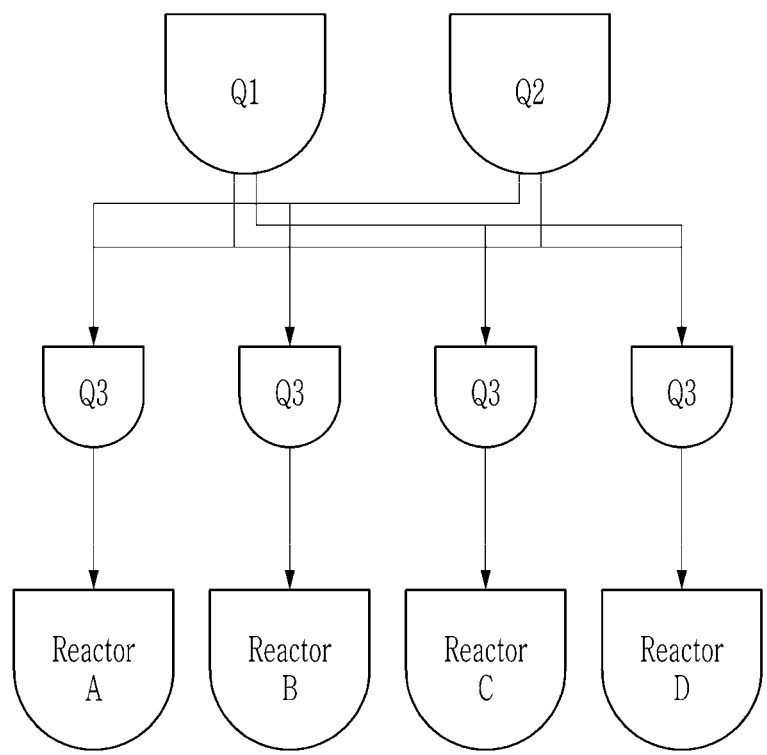
FIG. 3 is a conceptual diagram illustrating an apparatus for producing a precursor having a concentration gradient according to an exemplary embodiment of the present invention.
Figure 4:
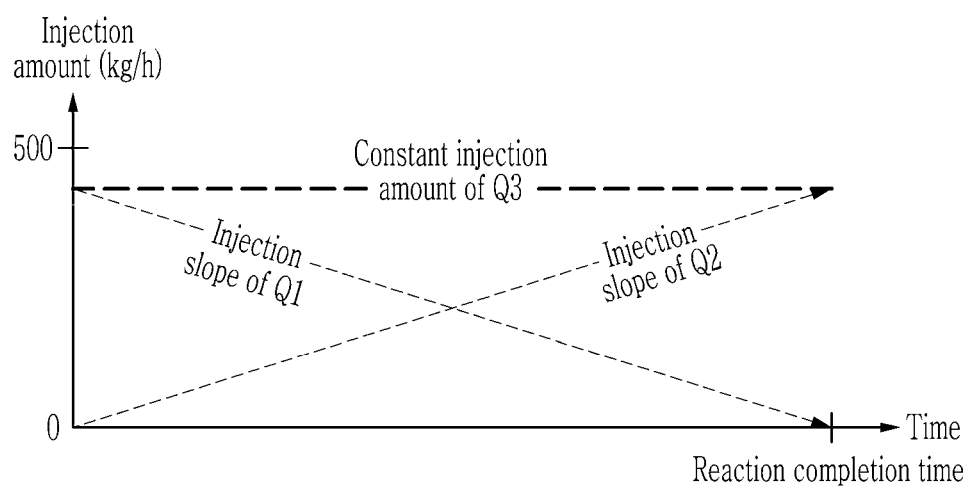
FIG. 4 is a graph illustrating an injection amount of a material depending on a reaction time ideal for the apparatus for producing a precursor having a concentration gradient.
Figure 5:
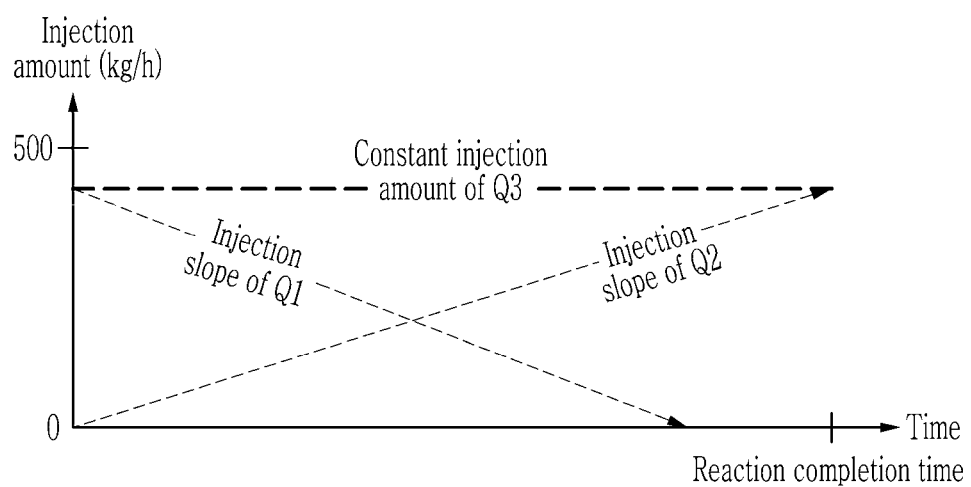
FIG. 5 is a graph illustrating an injection amount of a material depending on a reaction time ideal for the apparatus for producing a precursor according to an exemplary embodiment of the present invention.
Figure 6:
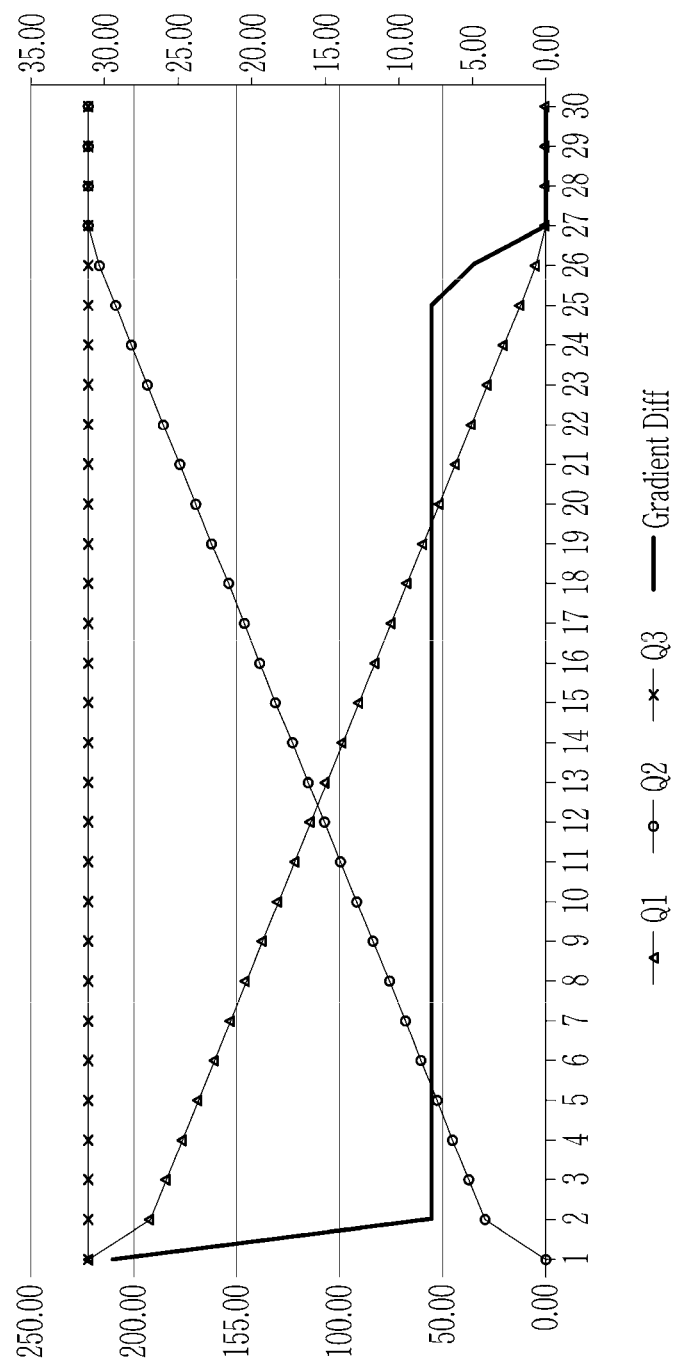
FIG. 6 is a graph illustrating an injection amount of a material depending on a reaction time when a feed amount of a material of a Q1 feed tank is simply calculated in a pattern in which it gradually decreases during a total process time.

FIG. 3 is a conceptual diagram illustrating an apparatus for producing a precursor having a concentration gradient according to an exemplary embodiment of the present invention. FIG. 4 is a graph illustrating an injection amount of a material depending on a reaction time ideal for the apparatus for producing a precursor having a concentration gradient. FIG. 5 is a graph illustrating an injection amount of a material depending on a reaction time ideal for the apparatus for producing a precursor according to an exemplary embodiment of the present invention. FIG. 6 is a graph illustrating an injection amount of a material depending on a reaction time when a feed amount of a material of a Q1 feed tank is simply calculated in a pattern in which it gradually decreases during a total process time.

Referring to FIG. 3, the apparatus for producing a precursor having a concentration gradient according to an exemplary embodiment of the present invention includes two feed tanks Q1 and Q2 storing metal solutions having different composition ratios, a plurality of mixers Q3 mixing the metal solutions having different a composition ratios injected from the two feed tanks Q1 and Q2, and a plurality of reactors A, B, C, and D connected to the plurality of mixers Q3 in a one-to-one corresponding manner and receiving the mixed metal solutions from the mixer Q3. In the present exemplary embodiment, the mixer Q3 and the reactors A, B, C, and D are illustrated as four, respectively, but the number of them may be increased or decreased as necessary. In the apparatus for producing a precursor having a concentration gradient, the metal solutions having different composition ratios injected from the two feed tanks Q1 and Q2 are mixed in the mixer Q3 in advance and then injected into the reactors A, B, C and D to perform the process. In the apparatus, a production capacity may be effectively increased or decreased only with the increase or decrease in the number of the mixer Q3 and the reactors A, B, C and D.

In the apparatus for producing a precursor having a concentration gradient, an injection amount of the mixed materials injected from the mixer Q3 into the reactors A, B, C, and D is constant, but in the feed flow rate injected from the two feed tanks Q1 and Q2 into the mixer Q3, the injection amount is required to be sequentially changed in a opposite pattern to each other in order to create a concentration gradient. The flow rate injected from the mixer Q3 into the reactor may be simply expressed as Equation 1 below:

Feed flow rate of $Q3$=(total amount of $Q1$+total amount of $Q2$)/reaction time      Equation 1

The feed flow rate of the mixer Q3 is always constantly injected throughout the reaction time, but the feed flow rate injected from the two feed tanks Q1 and Q2 to the mixer Q3 is to be the mixing ratio at which the concentration gradient is created in the mixer (Q3), and thus the injection schedules thereof are different from each other. FIG. 4 is a graph showing the most ideal schedule of the feed flow rate injected from the two feed tanks Q1 and Q2 to the mixer Q3.

However, in the mixer Q3, the reaction starts in a state in which the metal solution of the first feed tank Q1 is filled at a predetermined amount (500 kg in the embodiment) in advance. As a result, during the reaction, the injection amount of the material of the first feed tank Q1 is 500 kg or less than that of a second feed tank Q2, and after all the materials contained in the first feed tank Q1 are consumed, 500 kg of the material contained in the mixer Q3 is injected into the reactor. Thus, a graph for material feeding, as shown in FIG. 5, is to be created.

However, in order to change a precursor concentration, as shown in FIG. 1, a core portion of the precursor has a constant composition, without change in the composition, and a shell portion thereof has a specific slope for the change in concentration for each metal solution. In order to ensure that the injection amount of the material of the first feed tank Q1 is constantly changed for each time zone, the injection amount of the material of the first feed tank Q1 is calculated to be in a pattern that it gradually decreases for a total reaction time. However, due to 500 kg of the initial material of the first feed tank Q1 injected into the mixer Q3 in advance, as shown in FIG. 6, the difference between an injection flow rate for 1 hour in the first injection step and an injection flow rate for 1 hour in the second injection step, and the difference in the injection flow rate for 1 hour between the injection steps after the second injection step are differently calculated. This difference causes the concentration of the portion in contact with the core of the precursor formed by the initial reaction to change rapidly compared to other portions. In detail, FIG. 6 shows a material injection schedule for 30-hour reaction, and the feed flow rate from the mixer Q3 into the reactors A, B, C, and D is fixed at 221.77 kg/h. In order to initially fix a composition ratio of the core portion of the precursor, only the core composition solution is to be injected for 1 hour, and thereafter, the injection amount of the core composition solution is to be decreased by a constant flow rate difference. Herein, in calculating the decreased injection amount of the core composition solution, the flow rate of the core composition solution to be injected for 1 hour in the second injection step is calculated by using the feed flow rate per hour of the mixer Q3, 221.77 kg/h, and an injection amount of the core composition solution obtained by subtracting 500 kg injected into the mixer Q3 in advance from the total amount of the core composition solution (an amount of the material injected from the first feed tank Q1) as a basis for the calculation. However, the feed flow rate per hour of the mixer Q3, 221.77 kg/h is an amount calculated based on the total amount of the core composition solution, not based on the amount of the material injected from the first feed tank Q1. Thus, a degree of decrease in the flow rate of the core composition solution injected for 2 hours may be calculated to be large compared to a degree of decrease in the flow rate of the core composition solution after 2 hours. Table 1 below shows the detailed values of the flow rate for the injection schedule up to the initial 6 hours in FIG. 6.

TABLE 1

| Injection time (Hour) | Gradient Difference | Final injection amount of core | | |
|---|---|---|---|---|
| | | Q1 | Q2 | Q3 |
| 1 | 29.51 | 221.77 | 0 | 221.77 |
| 2 | 7.80 | 192.26 | 29.51 | 221.77 |
| 3 | 7.80 | 184.46 | 37.31 | 221.77 |
| 4 | 7.80 | 176.65 | 45.11 | 221.77 |
| 5 | 7.80 | 168.85 | 52.92 | 221.77 |
| 6 | 7.80 | 161.04 | 60.72 | 221.77 |
| 7 | 7.80 | 153.24 | 68.53 | 221.77 |

Referring to Table 1, the difference between the first injection flow rate and the second injection flow rate is 29.51 kg/h, and after the second flow rate, it constantly decrease at a slope of 7.80 kg/h. However, this rapid change in the first injection flow rate and the second injection flow rate causes the concentration of the portion in contact with the core of the precursor to change rapidly compared to that of other portions. In order to solve this problem, in an exemplary embodiment of the present invention, the following material injection scheduling method is provided.

Figure 7:
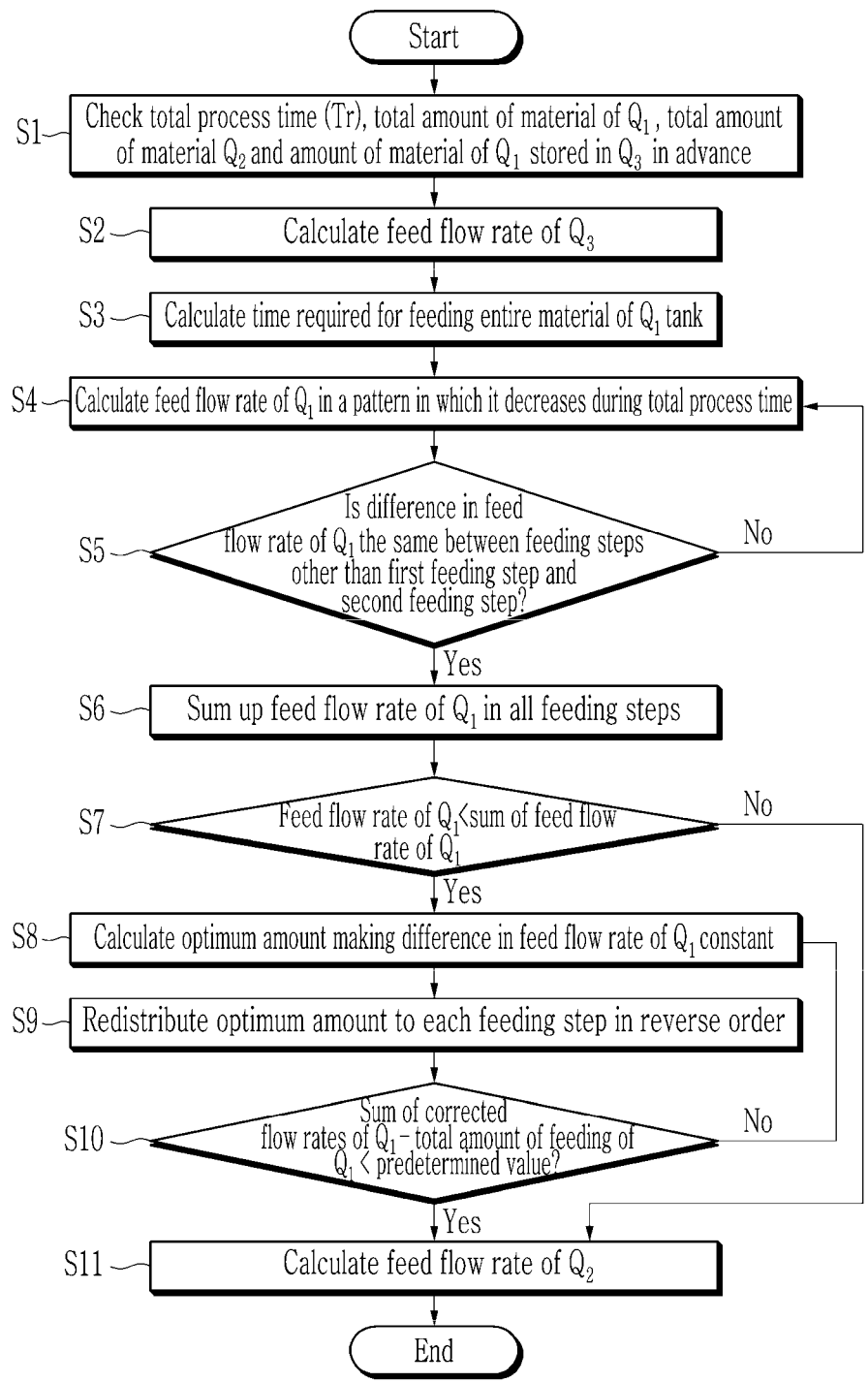
FIG. 7 is a flow chart of a material injection scheduling method for producing a precursor having a concentration gradient according to an exemplary embodiment of the present invention.
Figure 8:
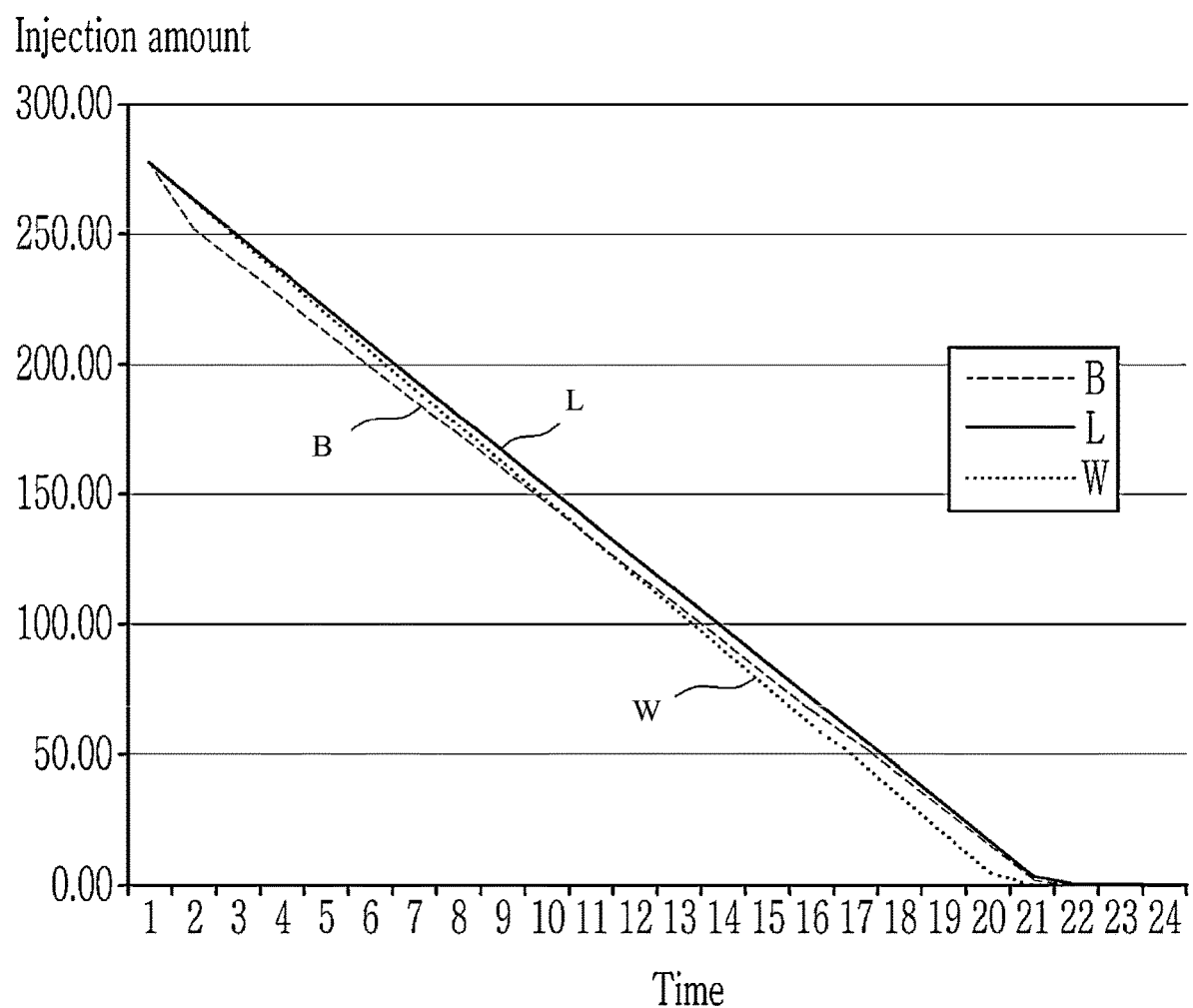
FIG. 8 is a graph illustrating a process of modifying an injection schedule of a feed amount of a material of a Q1 feed tank through the material injection scheduling method for producing a precursor having a concentration gradient according to an exemplary embodiment of the present invention.

FIG. 7 is a flow chart of a material injection scheduling method for producing a precursor having a concentration gradient according to an exemplary embodiment of the present invention. FIG. 8 is a graph illustrating a process of modifying an injection schedule of a feed amount of a material of a Q1 feed tank through the material injection scheduling method for producing a precursor having a concentration gradient according to an exemplary embodiment of the present invention.

Referring FIG. 7, first, the total process time (Tr), the total amount of the material of Q1 (total amount of the core material, a mixed solution of nickel and cobalt is used in this embodiment), the total amount of the material of Q2 (a mixed solution of nickel, cobalt and manganese is used in this embodiment), and the amount of the material of Q1 stored in Q3 in advance are checked (S1).

Next, the feed flow rate of Q3 is calculated by dividing the sum of the total amount of the material of Q1 and the total amount of the material of Q2 by the total process time (Tr) (S2).

Next, the time (TQ1) required for feeding the entire materials of the Q1 feed tank is calculated by subtracting the time required to consume the material of Q1 stored in Q3 in advance from the total process time (Tr) (value obtained by dividing the amount of the material of Q1 stored in Q3 in advance by the feed flow rate of Q3) (S3).

Next, during the total process time (Tr), the flow rate of the material to be fed from the Q1 feed tank into the Q3 feed tank is calculated in a pattern in which it gradually decreases (S4). Herein, the flow rate of Q1 (FQ1$t$) for each time (for feeding step) is calculated using Equation 2 below.

$FQ1t = 2 \times$(total amount of material of $Q1$−amount of material of $Q1$ stored in $Q3$ in advance−amount of material of $Q1$ injected in advance)/(time required for feeding entire materials of $Q1$ feed tank($TQ1$)−time already taken for injection into $Q1$)    Equation 2

The change in the flow rate of the material to be fed from the Q1 feed tank into the Q3 calculated through the above process may be represented as B in the graph of FIG. 8.

Next, it is determined whether or not the difference in the flow rate of the material to be fed from the Q1 feed tank into the Q3 feed tank is the same between feeding steps other than between the first feeding step and the second feeding step (for 1 hour and 2 hours after starting material feed of Q1) and between the last feeding step and the feeding step just before the last feeding step (S5). Herein, if it is determined to be 'NO', step (S4) is performed again, and if it is determined to be 'YES', the material injection scheduling method proceeds to next step (S6).

Next, the flow rate of Q1 (FQ1$t$) for each time (for each feeding step) calculated in step (S4) is summed (S6).

Next, it is determined whether or not the sum of the flow rate of Q1 (FQ1$t$) calculated in step (S6) is greater than the total amount of feeding of Q1 (total amount of material of Q1−amount of material of Q1 stored in Q3 in advance) (S7). Here, if it is determined to be 'NO', the flow rate of Q1 (FQ1$t$) calculated in step (S6) is determined as a feeding schedule of Q1 and the material injection scheduling method proceeds to step (S11), and if it is determined to be 'YES', the material injection scheduling method proceeds to step (S8).

Next, an optimum amount making the difference in the flow rate of Q1 (FQ1$t$) constant even in the first and second feed steps (for 1 hour and 2 hours after starting material feeding of Q1) is calculated (S8). These optimum amounts may be calculated by repeatedly inputting estimation values, or by creating an Equation representing a line L shown in FIG. 8 and substituting each time values.

Next, a difference between the optimum amount calculated in step (S8) and the flow rate of Q1 (FQ1$t$) for each time (for each feeding step) calculated in step (S4) is calculated, and the values of the difference are arranged to feeding step in reverse order to be subtracted from the optimum amount calculated in step (S8), such that a corrected flow rate of Q1 in each feeding step is obtained (S9). The corrected flow rate of Q1 in each feeding step may be represented as W in the graph of FIG. 8.

Next, it is determined whether or not the value obtained by subtracting the total amount of feeding of Q1 from the sum of the corrected flow rates of Q1 in each feeding step is smaller than a predetermined value set in advance (S10). Herein, if it is determined to be 'NO', steps (S8 and S9) are performed again, and if it is determined to be 'YES', the corrected flow rate of Q1 is determined as the feeding schedule of Q1 and the material injection scheduling method proceeds to step (S11).

Next, the feed flow rate of Q2 is calculated by subtracting the feed schedule of Q1 determined in step S10 from the feed flow rate of Q3 (S11).

Figure 9A:
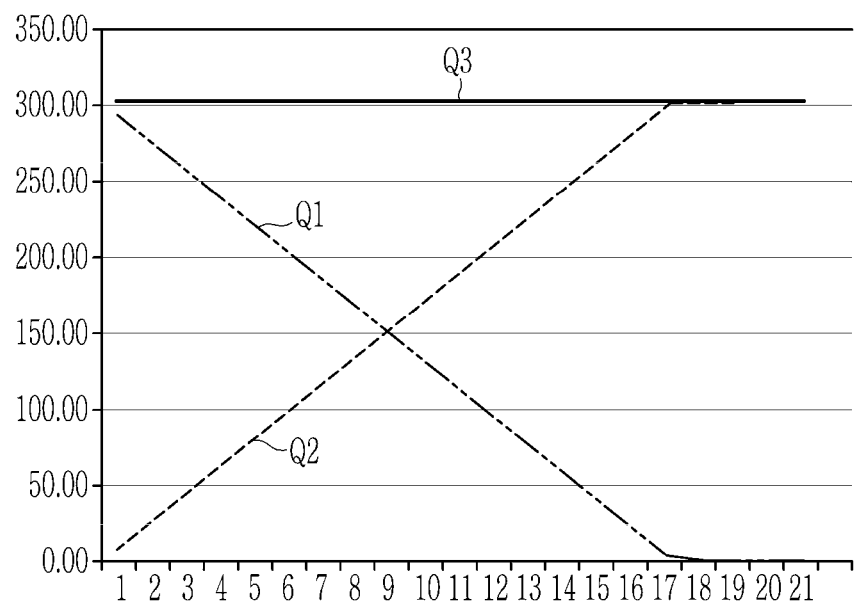
FIG. 9A is a graph illustrating a material injection schedule in a co-precipitation process having a reaction time of 22 hours, created using the material injection scheduling method for producing a precursor having a concentration gradient according to an exemplary embodiment of the present invention.
Figure 9B:
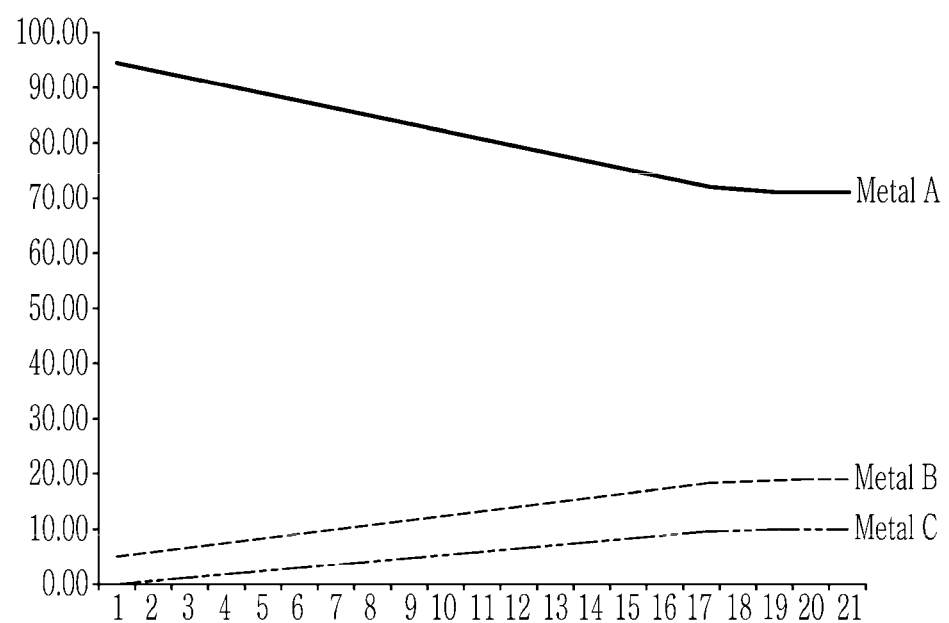
FIG. 9B is a graph illustrating a composition ratio of a shell portion of a precursor prepared according to the material injection schedule of FIG. 9A.
Figure 10A:
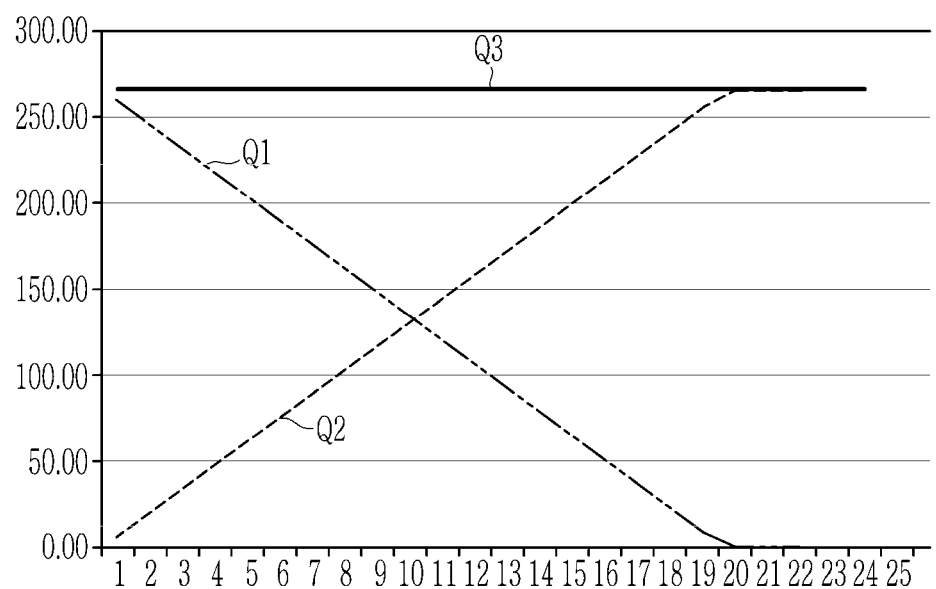
FIG. 10A is a graph illustrating a material injection schedule in a co-precipitation process having a reaction time of 25 hours, created using the material injection scheduling method for producing a precursor having a concentration gradient according to an exemplary embodiment of the present invention.
Figure 10B:
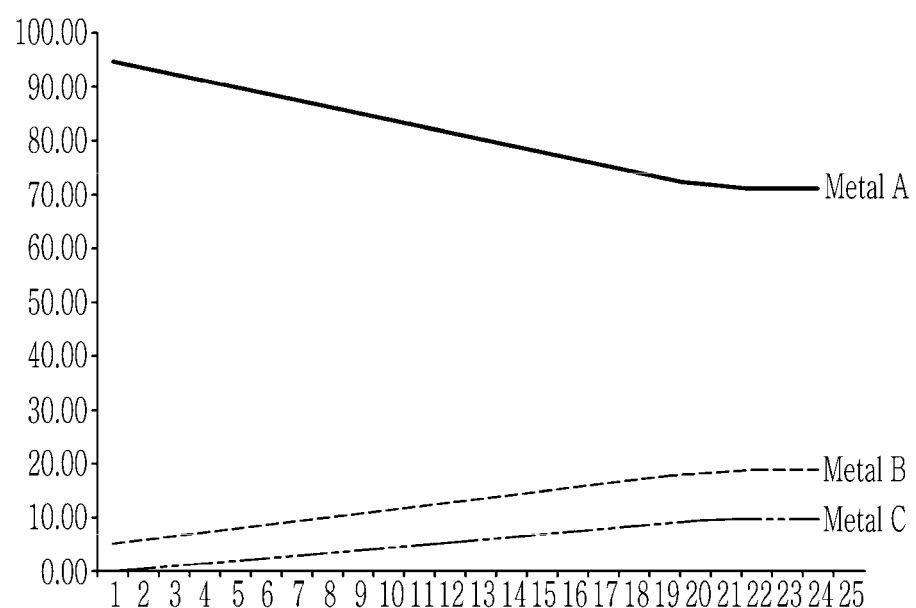
FIG. 10B is a graph illustrating a composition ratio of a shell portion of a precursor prepared according to the material injection schedule of FIG. 10A.
Figure 11A:
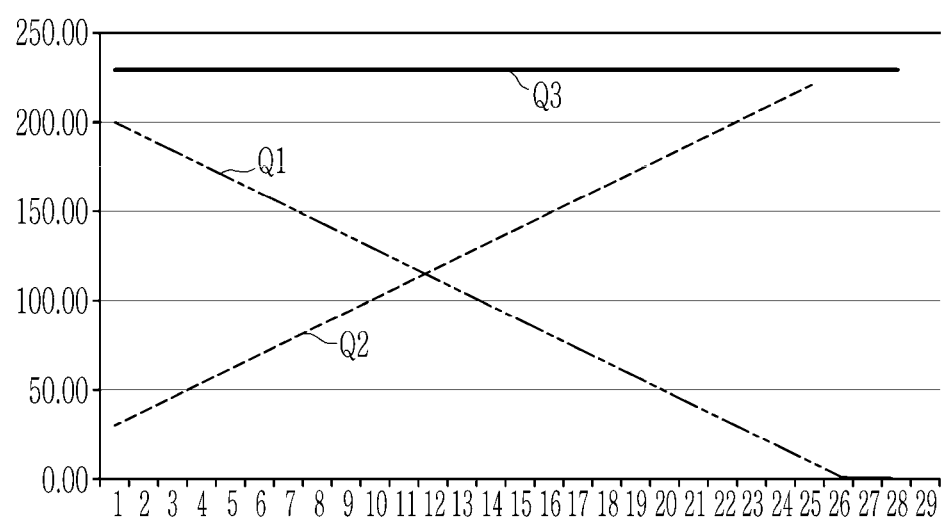
FIG. 11A is a graph illustrating a material injection schedule in a co-precipitation process having a reaction time of 30 hours, created using the material injection scheduling method for producing a precursor having a concentration gradient according to an exemplary embodiment of the present invention.
Figure 11B:
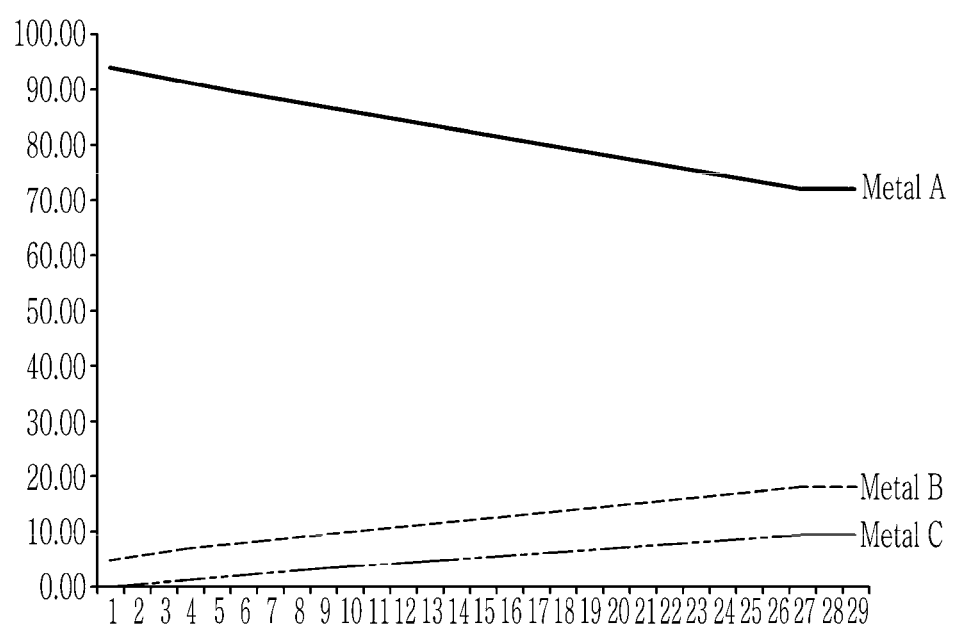
FIG. 11B is a graph illustrating a composition ratio of a shell portion of a precursor prepared according to the material injection schedule of FIG. 11A.

When the material injection scheduling method as described above is used, a precursor having a uniform concentration gradient may be produced even though the reaction time is changed. FIG. 9A, FIG. 10A, and FIG. 11A show the results obtained by calculating the material injection schedule of the co-precipitation process with reaction times of 22 hours, 25 hours, and 30 hours, respectively, according to an embodiment of the present invention. As can be seen in FIG. 9B, FIG. 10B, and FIG. 11B, when the schedule obtained through the material injection scheduling method according to the embodiment of the present invention is used, a precursor may be formed to have a uniform concentration gradient even in the vicinity of the core.

Although embodiments of the present invention have been described in detail hereinabove, the scope of the present invention is not limited thereto, but may include several modifications and alterations made by those skilled in the art using a basic concept of the present invention as defined in the claims.

The invention claimed is:

1. A material injection scheduling method for producing a precursor having a concentration gradient using an apparatus for producing a precursor having a concentration gradient mixing a material of a first feed tank (Q1) and a material of a second feed tank (Q2) with each other in advance in a mixer (Q3) to form a mixed material and injecting the mixed material into a reactor, the method comprising:

(a) transferring a predetermined amount of the material from Q1 to Q3 to be stored in Q3 in advance;

(b) calculating a feed flow rate Q3 by dividing a sum of a total amount of the material from Q1 and a total amount of a material from Q2 by a total process time (Tr);

(c) calculating a feed flow rate of the material from Q1 during a total process time (Tr), using Equation 2 below;

the flow rate($FQ1t$) of the material from $Q1$ for a given time interval=$2 \times$(total amount of material from $Q1$−the predetermined amount of material from $Q1$ stored in $Q3$ in advance−amount of material from $Q1$ injected prior to the given time interval)/(time required for feeding entire material from $Q1$ feed tank($TQ1$)−time already taken for injection into $Q3$)    Equation 2

(d) calculating an optimal value of FQ1$t$ for making a difference in FQ1$t$ to be a constant by iteratively inputting an estimated value of FQ1$t$;

(e) correcting the feed flow rate of the material from Q1 by redistributing a difference between the optimal value of FQ1$t$ obtained in (d) and the flow rate (FQ1$t$) for each time interval as calculated in (c), and the values of the difference are arranged to time in reverse order to be subtracted from the optimal value of FQ1$t$ obtained in (d); and (f) calculating a feed flow rate of the material from Q2 by subtracting the feed flow rate of the material from Q1 corrected in (e) from the feed flow rate of the material from Q3, (g) setting the feed flow rate of the material from Q1 to be the feed flow rate calculated in (e) for supplying the material from Q1 into Q3, and setting the feed flow rate of material from Q2 to be the feed flow rate calculated in (f) for supplying the material from Q2 into Q3 so as to form a mixed material, and (h) supplying the mixed material into a reactor wherein a co-precipitation reaction takes place.

2. The method of claim 1, further comprising, between (b) and (c), (bb) calculating a time taken for feeding the entire material from Q1 in consideration of an amount of the material from Q1 injected into Q3 before mixing the material from Q1 and the material from Q2 with each other in Q3.

3. The method of claim 2, further comprising between (c) and (e), (cd) determining whether or not the difference in the feed flow rate of the material from Q1 is the same between feeding steps other than between a first time interval and a second time internal and between a last time interval and a time interval just before the last time interval.

4. The method of claim 3, wherein: if it is determined at (cd) that the difference in the feed flow rate of the material from Q1 is not the same between time intervals other than between the first time interval and the second time interval and between the last time interval and the time interval just before the last time interval, (c) is performed again.

5. The method of claim 4, further comprising, between (cd) and (e), (cd1) adding individual values of the feed flow rate of the material from Q1 for total process time calculated in (c); and (cd2) determining whether or not the sum of the individual values of the feed flow rate of the material from Q1 calculated in (cd1) is greater than a total amount of material to be injected from Q1 into Q3 during the total process time Tr.

6. The method of claim 1, further comprising, between (e) and (f), (ee) determining whether or not a difference between the sum of the feed flow rates of the material from Q1 and the total amount of the material to be injected from Q1 into Q3 is a predetermined value or less.

7. The method of claim 6, wherein: if the difference between the sum of the feed flow rates of the material from Q1 and the total amount of the material to be injected from Q1 into Q3 is not the predetermined value or less in (ee), (d) and (e) are performed again.

8. The method of claim 1, wherein: the material from Q1 is a mixed solution of nickel and cobalt, and the material from Q2 is a mixed solution of nickel, cobalt, and manganese.

* * * * *